(12) United States Patent
Komazawa et al.

(10) Patent No.: US 11,106,401 B2
(45) Date of Patent: Aug. 31, 2021

(54) PRINT INSTRUCTION APPARATUS, PRINT SYSTEM, AND NON-TRANSITORY COMPUTER READABLE MEDIUM

(71) Applicant: FUJIFILM Business Innovation Corp., Tokyo (JP)

(72) Inventors: Hisao Komazawa, Kanagawa (JP); Koji Takahata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/544,890

(22) Filed: Aug. 19, 2019

(65) Prior Publication Data

US 2020/0301623 A1 Sep. 24, 2020

(30) Foreign Application Priority Data

Mar. 20, 2019 (JP) .............................. JP2019-053401

(51) Int. Cl.
*G06F 3/12* (2006.01)
*G06K 15/00* (2006.01)

(52) U.S. Cl.
CPC .......... *G06F 3/1205* (2013.01); *G06F 3/1254* (2013.01); *G06F 3/1255* (2013.01)

(58) Field of Classification Search
None
See application file for complete search history.

(56) References Cited

U.S. PATENT DOCUMENTS

2015/0062622 A1* 3/2015 Ito ...................... G06K 15/4065
358/1.15
2015/0294200 A1* 10/2015 Ito ...................... G06K 15/4065
358/1.15

FOREIGN PATENT DOCUMENTS

JP 2016-175354 10/2016

* cited by examiner

*Primary Examiner* — Dov Popovici
(74) *Attorney, Agent, or Firm* — JCIPRNET (57) ABSTRACT

A print instruction apparatus includes memory, an obtaining unit, and a controller. The memory stores attribute information of paper. The obtaining unit obtains paper feed information in which attribute information of paper is set to a paper feed unit provided in a printing apparatus. The controller applies control to, in accordance with whether or not the attribute information of paper is set to the paper feed unit on the basis of the obtained paper feed information, perform rewriting of the attribute information of paper with the attribute information of paper stored in the memory.

14 Claims, 7 Drawing Sheets

| STOCK NAME | ATTRIBUTES OF STOCK |
|---|---|
| STOCK A | SIZE: A4<br>TYPE: INDEX PAPER<br>BASIS WEIGHT: 90 gsm |
| STOCK C | SIZE: B5<br>TYPE: PLAIN PAPER<br>BASIS WEIGHT: 65 gsm |

413

| STOCK NAME | ATTRIBUTES OF STOCK | TRAY NO. |
|---|---|---|
| STOCK A | SIZE: A4<br>TYPE: PLAIN PAPER<br>BASIS WEIGHT: 90 gsm | NONE |
| STOCK B | SIZE: A3<br>TYPE: INDEX PAPER<br>BASIS WEIGHT: 105 gsm | NONE |

| STOCK NAME | ATTRIBUTES OF STOCK |
|---|---|
| STOCK A | SIZE: A4<br>TYPE: INDEX PAPER<br>BASIS WEIGHT: 90 gsm |
| STOCK C | SIZE: B5<br>TYPE: PLAIN PAPER<br>BASIS WEIGHT: 65 gsm |

⇧ DELETE ALL

413

| STOCK NAME | ATTRIBUTES OF STOCK | TRAY NO. |
|---|---|---|
| NONE | NONE | NONE |
| NONE | NONE | NONE |

| STOCK NAME | ATTRIBUTES OF STOCK |
|---|---|
| STOCK A | SIZE: A4<br>TYPE: INDEX PAPER<br>BASIS WEIGHT: 90 gsm |
| STOCK C | SIZE: B5<br>TYPE: PLAIN PAPER<br>BASIS WEIGHT: 65 gsm |

⇧ ADD

413

| STOCK NAME | ATTRIBUTES OF STOCK | TRAY NO. |
|---|---|---|
| STOCK A | SIZE: A4<br>TYPE: INDEX PAPER<br>BASIS WEIGHT: 90 gsm | NONE |
| STOCK C | SIZE: B5<br>TYPE: PLAIN PAPER<br>BASIS WEIGHT: 65 gsm | NONE |

FIG. 6A

| STOCK NAME | ATTRIBUTES OF STOCK | TRAY NO. |
|---|---|---|
| STOCK A | SIZE: A4<br>TYPE: PLAIN PAPER<br>BASIS WEIGHT: 90 gsm | 1 |
| STOCK B | SIZE: A3<br>TYPE: INDEX PAPER<br>BASIS WEIGHT: 105 gsm | NONE |

412
4121
413

212

| STOCK NAME | ATTRIBUTES OF STOCK |
|---|---|
| NONE | NONE |

| STOCK NAME | ATTRIBUTES OF STOCK | TRAY NO. |
|---|---|---|
| NONE | NONE | NONE |

DELETE ALL

212

| STOCK NAME | ATTRIBUTES OF STOCK |
|---|---|
| NONE | NONE |

FIG. 7A

| STOCK NAME | ATTRIBUTES OF STOCK |
|---|---|
| STOCK A | SIZE: A4<br>TYPE: INDEX PAPER<br>BASIS WEIGHT: 90 gsm |
| STOCK B | SIZE: B5<br>TYPE: PLAIN PAPER<br>BASIS WEIGHT: 65 gsm |

212

| STOCK NAME | ATTRIBUTES OF STOCK | TRAY NO. |
|---|---|---|
| STOCK A | SIZE: A4<br>TYPE: PLAIN PAPER<br>BASIS WEIGHT: 90 gsm | 1 |
| STOCK B | SIZE: A3<br>TYPE: INDEX PAPER<br>BASIS WEIGHT: 105 gsm | NONE |

| STOCK NAME | ATTRIBUTES OF STOCK |
|---|---|
| STOCK A | SIZE: A4<br>TYPE: INDEX PAPER<br>BASIS WEIGHT: 90 gsm |
| STOCK B | SIZE: B5<br>TYPE: PLAIN PAPER<br>BASIS WEIGHT: 65 gsm |

212

DELETE ⇧

| STOCK NAME | ATTRIBUTES OF STOCK | TRAY NO. |
|---|---|---|
| STOCK A | SIZE: A4<br>TYPE: PLAIN PAPER<br>BASIS WEIGHT: 90 gsm | 1 |
| NONE | NONE | NONE |

| STOCK NAME | ATTRIBUTES OF STOCK |
|---|---|
| STOCK A | SIZE: A4<br>TYPE: INDEX PAPER<br>BASIS WEIGHT: 90 gsm |
| STOCK B | SIZE: B5<br>TYPE: PLAIN PAPER<br>BASIS WEIGHT: 65 gsm |

212

ADD ⇧

| STOCK NAME | ATTRIBUTES OF STOCK | TRAY NO. |
|---|---|---|
| STOCK A | SIZE: A4<br>TYPE: PLAIN PAPER<br>BASIS WEIGHT: 90 gsm | 1 |
| STOCK B | SIZE: B5<br>TYPE: PLAIN PAPER<br>BASIS WEIGHT: 65 gsm | NONE |

| STOCK NAME | ATTRIBUTES OF STOCK |
|---|---|
| STOCK A | SIZE: A4<br>TYPE: INDEX PAPER<br>BASIS WEIGHT: 90 gsm |

212

| STOCK NAME | ATTRIBUTES OF STOCK | TRAY NO. |
|---|---|---|
| STOCK A | SIZE: A4<br>TYPE: PLAIN PAPER<br>BASIS WEIGHT: 90 gsm | 1 |

| STOCK NAME | ATTRIBUTES OF STOCK |
|---|---|
| STOCK A | SIZE: A4<br>TYPE: INDEX PAPER<br>BASIS WEIGHT: 90 gsm |

212

⬆ DELETE

| STOCK NAME | ATTRIBUTES OF STOCK | TRAY NO. |
|---|---|---|
| NONE | NONE | NONE |

| STOCK NAME | ATTRIBUTES OF STOCK |
|---|---|
| STOCK A | SIZE: A4<br>TYPE: INDEX PAPER<br>BASIS WEIGHT: 90 gsm |

212

⬆ ADD

| STOCK NAME | ATTRIBUTES OF STOCK | TRAY NO. |
|---|---|---|
| STOCK A | SIZE: A4<br>TYPE: INDEX PAPER<br>BASIS WEIGHT: 90 gsm | NONE |

PRINT INSTRUCTION APPARATUS, PRINT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-053401 filed Mar. 20, 2019.

BACKGROUND

(i) Technical Field

The present disclosure relates to a print instruction apparatus, a print system, and a non-transitory computer readable medium.

(ii) Related Art

In recent years, there has been proposed an image forming apparatus that forms an image that the user intended in the case of forming an image by taking into consideration extended recording medium information (for example, see Japanese Unexamined Patent Application Publication No. 2016-175354).

The image forming apparatus described in Japanese Unexamined Patent Application Publication No. 2016-175354 includes: an image forming unit that forms an image; an image formation controller that is connected to the image forming unit and that controls image formation performed by the image forming unit; a comparing unit that provides, in each of the image formation controller and the image forming unit, medium information memory that stores medium information defined in accordance with a recording medium on which image formation is performed, and that compares medium information in the image formation controller with medium information in the image forming unit; and a synchronizing unit that, in a case where the two pieces of medium information are inconsistent with each other as a result of comparison performed by the comparison unit, synchronizes the medium information in the image forming unit with the medium information in the image formation controller.

In a configuration where attribute information of paper is transferrable and settable from a print instruction apparatus to a paper feed unit included in a printing apparatus, if the power of the printing apparatus is off or the printing apparatus is in a power-saving state, attribute information of paper is untransferable from the print instruction apparatus, and inconsistency may occur between attribute information of paper held by the print instruction apparatus and attribute information of paper held by the printing apparatus.

SUMMARY

Aspects of non-limiting embodiments of the present disclosure relate to providing a print instruction apparatus, a print system, and a non-transitory computer readable medium for suppressing inconsistency between attribute information of paper held in the print instruction apparatus and attribute information of paper held in a printing apparatus even in the case where the power of the printing apparatus is off or the printing apparatus is in a power-saving state.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a print instruction apparatus including memory, an obtaining unit, and a controller. The memory stores attribute information of paper. The obtaining unit obtains paper feed information in which attribute information of paper is set to a paper feed unit provided in a printing apparatus. The controller applies control to, in accordance with whether or not the attribute information of paper is set to the paper feed unit on the basis of the obtained paper feed information, perform rewriting of the attribute information of paper with the attribute information of paper stored in the memory.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described with reference to the drawings. Elements in the drawings that have substantially the same function are given the same reference numeral, and overlapping descriptions are omitted.

Summary of Exemplary Embodiment

A print instruction apparatus according to the present exemplary embodiment includes: memory that stores attribute information of paper; an obtaining unit that obtains paper feed information in which attribute information of paper is set to a paper feed unit provided in a printing apparatus; and a controller that applies control to, in accordance with whether or not the attribute information of paper is set to the paper feed unit on the basis of the obtained paper feed information, perform rewriting of the attribute information of paper with the attribute information of paper stored in the memory.

Exemplary Embodiment

Figure 1:
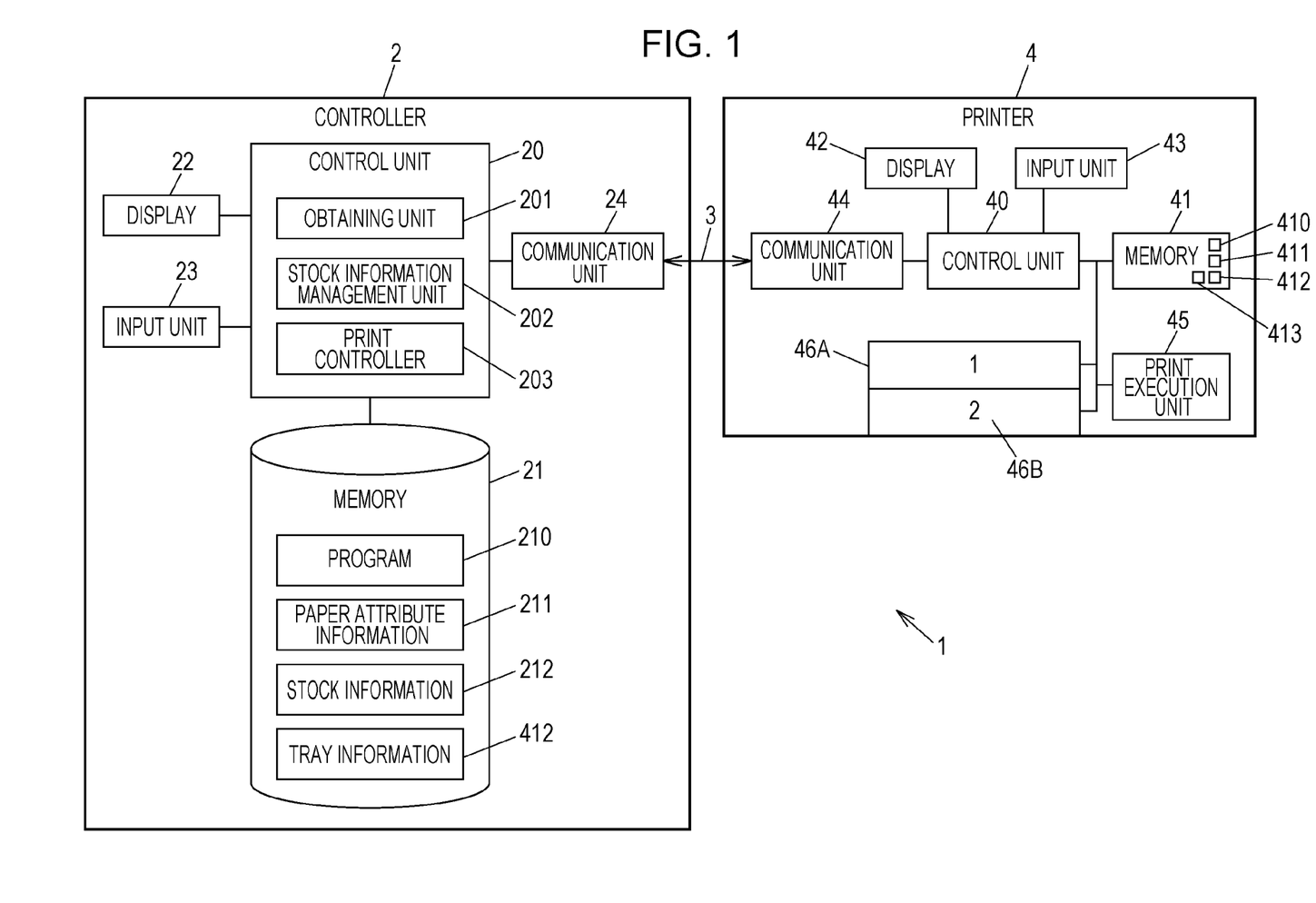
FIG. 1 is a block diagram illustrating an example of the configuration of a print system according to an exemplary embodiment of the present disclosure.

FIG. 1 is a diagram illustrating an example of the configuration of a print system according to the exemplary embodiment of the present disclosure. A print system 1 includes a controller 2 and a printer 4 connected to the controller 2 via a communication line 3. The controller 2 is an example of a print instruction apparatus. The printer 4 is an example of a printing apparatus.

Various settings of the controller 2 are made by an administrator (hereinafter referred to as a first administrator) of the print system 1 or the controller 2. Various settings of the printer 4 are made by an administrator (hereinafter referred to as a second administrator) of the printer 4. For this reason, as will be described later, inconsistency may occur between information set in the controller 2 and information set in the printer 4.

Configuration of Controller

The controller 2 includes the following: a control unit 20, which controls each unit of the controller 2; memory 21, which stores various types of information; a display 22, which is realized by a liquid crystal display (LCD) or the like; an input unit 23, which is realized by a keyboard, a mouse, and the like; and a communication unit 24, which transmits and receives information to and from the printer 4 via the communication line 3. Note that the display 22 and the input unit 23 may be realized by, for example, a touchscreen display where the display 22 and the input unit 23 are integrated.

The control unit 20 includes a central processing unit (CPU), an interface, and the like. By operating in accordance with a program 210 stored in the memory 21, the CPU functions as an obtaining unit 201, a stock information management unit 202, a print controller 203, and so forth. Note that the units 201 to 203 will be described in detail later. The stock information management unit 202 is an example of a controller.

The memory 21 includes read-only memory (ROM), random-access memory (RAM), a hard disk, and so forth. The program 210, and various types of information such as paper attribute information 211 (see FIG. 2), stock information 212 (see FIG. 3), and tray information 412 (see FIG. 4) are stored in the memory 21. The stock information 212 is an example of attribute information of paper. The tray information 412 is an example of paper feed information.

The paper attribute information 211 is attribute information of paper, based on which the stock information 212 is generated. The paper attribute information 211 will be described in detail later.

The stock information 212 is set by the first administrator to be applied to the printer 4, and is stored in the memory 21 of the controller 2. For this reason, the stock information 212 may not be stored in the memory 21 of the controller 2. The stock information 212 will be described in detail later.

Because the tray information 412 is information to be obtained from the printer 4 and t be stored in the memory 21, if the tray information 412 is unobtainable from the printer 4, the tray information 412 is not stored in the memory 21. The tray information 412 will be described in detail later.

Configuration of Printer

The printer 4 includes the following: a control unit 40, which controls each unit of the printer 4; memory 41, which stores various types of information; a display 42, which is realized by a liquid crystal display (LCD) or the like; an input unit 43, which is realized by a keyboard, a mouse, and the like; a communication unit 44, which transmits and receives information to and from the controller 2 via the communication line 3; a print execution unit 45, which executes printing; and a plurality of paper feed trays 46A and 46B (hereinafter may collectively be referred to as "paper feed trays 46"), which feed paper to the print execution unit 45. The paper feed trays 46 are an example of a paper feed unit. Note that the display 42 and the input unit 43 may be realized by, for example, a touchscreen display where the display 42 and the input unit 43 are integrated.

The control unit 40 includes a central processing unit (CPU), an interface, and the like. The CPU operates in accordance with a program 410 stored in the memory 41. On the basis of a print job transmitted from the controller 2, the control unit 40 applies control to allow a corresponding one of the paper feed trays 46 to feed paper, and to allow the print execution unit 45 to execute printing.

The control unit 40 communicates with the controller 2 when the printer 4 is turned on, for example, and transmits information on the paper feed trays 46 (such as the number of paper feed trays 46, tray numbers, and the like) as its device information to the controller 2. Note that the control unit 40 is configured to not transmit stock information 413 that is not assigned to a paper feed tray 46 to the controller 2 even when requested from the controller 2.

The memory 41 includes read-only memory (ROM), random-access memory (RAM), a hard disk, and so forth. The program 410, and various types of information such as paper attribute information 411, tray information 412 (see FIG. 4) assigned to a paper feed tray 46, and the stock information 413 not assigned to a paper feed tray 46 are stored in the memory 41.

The paper attribute information 411 has the same items as the paper attribute information 211 described in the controller 2.

The stock information 413 is information that is not assigned to a paper feed tray 46, and has the same items as the stock information 212 described in the controller 2. The stock information 413 is set by the second administrator in order to be assigned to a paper feed tray 46, and is stored in the memory 41 of the printer 4. Because different persons set the stock information 212 in the controller 2 and the stock information 413 in the printer 4, inconsistency may occur between the stock information 212 and the stock information 413. The stock information 413 is deleted by the control unit 40 when assigned to a paper feed tray 46.

Figure 2:
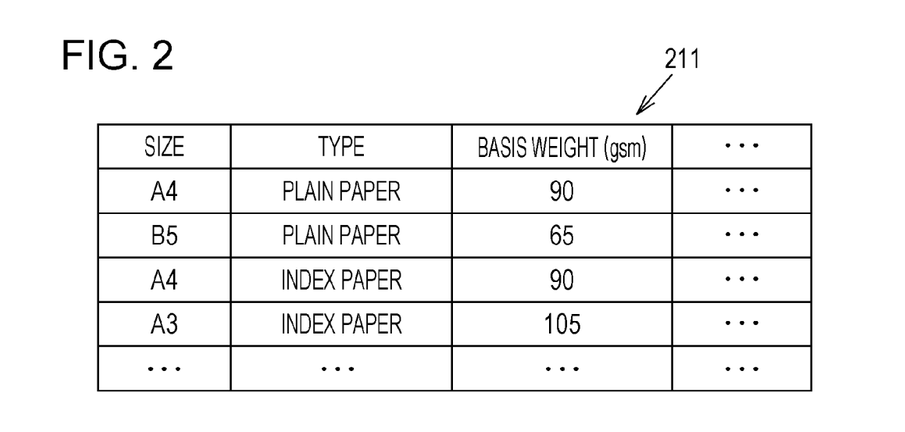
FIG. 2 illustrates an example of paper attribute information.

FIG. 2 illustrates an example of the paper attribute information 211. The paper attribute information 211 has items such as size, type, and basis weight. The size of paper, such as A4, A3, or B5, is indicated in size. The type of paper, such as plain paper or index paper, is indicated in type. The paper weight in grams per square meter is indicated in basis weight.

Figure 3:
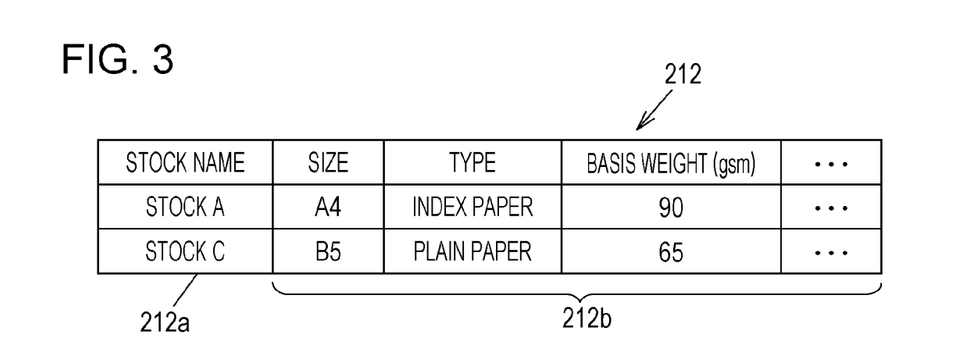
FIG. 3 illustrates an example of stock information.

FIG. 3 illustrates an example of the stock information 212. The stock information 212 includes a stock name 212a for identifying the stock information 212, and paper attribute information 212b selected from the paper attribute information 211. The stock information 212 has items such as stock name, size, type, and basis weight. The stock name 212a is recorded in stock name. Size, type, and basis weight of the paper attribute information 212b are the same as those described in FIG. 2. The stock name 212a is an example of identification information of attribute information of paper.

Figure 4:
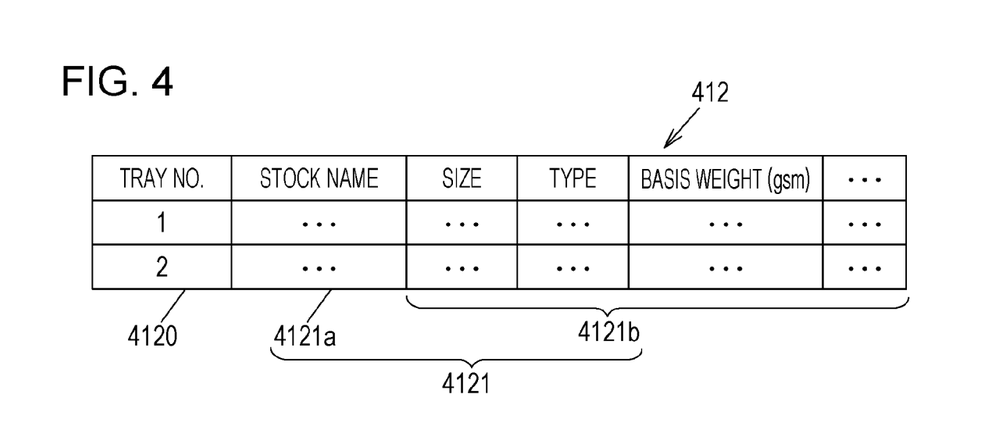
FIG. 4 illustrates an example of tray information.

FIG. 4 illustrates an example of the tray information 412. The tray information 412 includes a tray number 4120 for identifying a paper feed tray 46, and stock information 4121 assigned to the tray number 4120. The stock information 4121 includes a stock name 4121a, and paper attribute information 4121b. The tray information 412 has items such as tray number, stock name, size, type, and basis weight. Size, type, and basis weight of the paper attribute information 4121b are the same as those described in FIG. 2. The tray number 4120 of a paper feed tray 46 is recorded in tray number, as in "1", "2", or the like. The tray number 4120 is an example of identification information of a paper feed unit. The stock name 4121a is an example of identification information of attribute information of paper.

Next, the units 201 to 203 of the control unit 20 will be described.

The obtaining unit 201 communicates with the printer 4 and obtains the tray information 412 from the printer 4. Since the printer 4 is not configured to transmit the stock information 413 not assigned to a paper feed tray 46 to the controller 2, the obtaining unit 201 is incapable of obtaining that stock information 413.

The stock information management unit 202 applies control to, in accordance with whether or not the stock information 4121 is set to a paper feed tray 46 on the basis of the obtained tray information 412, perform rewriting of the stock information 4121 and 413 held by the printer 4 with the stock information 212 stored in the memory 21.

That is, in the case where the stock information 4121 is set to a paper feed tray 46, rewriting is performed in accordance with consistency between the stock information 4121 or the paper attribute information 4121b included in the obtained tray information 412 and the stock information 212 or the paper attribute information 212b stored in the memory 21.

For example, no rewriting is performed in the case where the stock name 4121a included in the obtained tray information 412 is identical to the stock name 212a of the stock information 212 stored in the memory 21, and the items of paper attribute information 4121b and 212b are identical.

In contrast, the above-described rewriting is performed in the case where the stock name 4121a included in the obtained tray information 412 is identical to the stock name 212a of the stock information 212 stored in the memory 21, and the items of paper attribute information 4121b and 212b are different. In this case, at the time of performing rewriting, control is applied to display on the display 42 of the printer 4 that the paper attribute information 4121b has been rewritten. Note that the stock information management unit 202 may display a confirmation screen on the display 42, and may perform rewriting in the case where rewriting is permitted.

In the case where the stock information 413 is not set to a paper feed tray 46, the stock information management unit 202 may apply control to perform the above-described rewriting regardless of consistency between the stock information 4121 included in the obtained tray information 412 and the stock information 212 stored in the memory 21.

The stock information management unit 202 may apply control to perform the above-described rewriting even in the case where the obtaining unit 201 is unable to obtain the tray information 412. In addition, in the case where the stock information 212 is not stored in the memory 21, the stock information management unit 202 may apply control to delete the stock information 413 held by the printer 4.

The stock information management unit 202 performs the above-described rewriting at a predetermined time point. The predetermined time point is, for example, when the printer 4 is restored from a power-off state or a power-saving state to a normal state. A power-saving state is a state in which power consumption is smaller than in a normal state. A power-saving state includes a state in which, for example, a fixing temperature for printing and fixing an image on paper is decreased.

Operation of Controller

Figure 9:
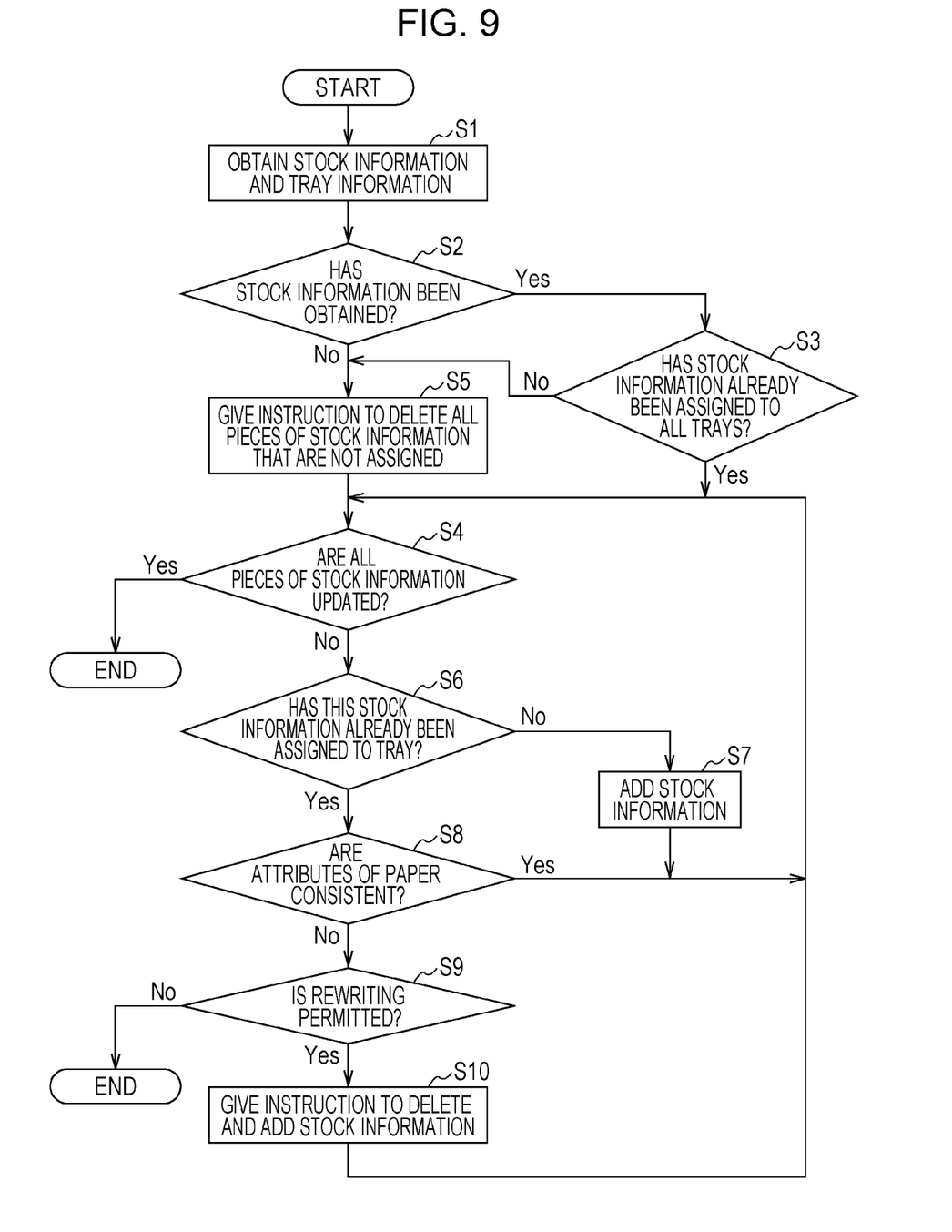
FIG. 9 is a flowchart illustrating an example of the operation of the controller.

Next, an example of the operation of the controller 2 will be described. FIG. 9 is a flowchart illustrating an example of the operation of the controller 2. The following description assumes that the controller 2 has already communicated with the printer 4 and obtained the number of paper feed trays 46 and tray numbers.

The obtaining unit 201 of the controller 2 communicates with the printer 4, obtains the tray information 412 from the printer 4, and obtains the stock information 212 from the memory 21 (S1).

The stock information management unit 202 determines whether or not the stock information 212 has been obtained, that is, whether or not the stock information 212 is stored in the memory 21 (S2). In the case where there is the stock information 212 (YES in S2), the stock information management unit 202 determines, on the basis of the tray information 412 obtained in step S1, whether or not the stock information 4121 has already been assigned to all the paper feed trays 46, that is, the tray numbers 4120 (S3).

In the case where the stock information 4121 has already been assigned (YES in S3), it is determined whether or not updating of stock information held by the printer 4 to all the pieces of stock information held by the controller 2 is completed (S4). In the case where updating is competed (YES in S4), the process ends.

In the case where there is no stock information 212 in the controller 2 in step S2 described above (NO in S2), or in the case where no stock information 413 has been assigned to all the paper feed trays 46 in step S3 described above (NO in S3), the stock information management unit 202 instructs the printer 4 to delete all the pieces of stock information 413 not assigned to a paper feed tray 46 (S5). The control unit 40 of the printer 4 deletes the stock information 413 stored in the memory 41. In the case where updating of stock information held by the printer 4 to all the pieces of stock information held by the controller 2 is completed (YES in S4), the process ends.

In the case where updating to all the pieces of stock information 212 is not completed in step S4 described above (NO in S4), it is determined whether the stock information 212 has already been assigned as the tray information 412 to a paper feed tray 46 (S6). In the case where the stock information 212 has not been assigned (NO in S6), the stock information 212 is transmitted to the printer 4, and the printer 4 is instructed to add the stock information 212 (S7). The control unit 40 of the printer 4 stores the transmitted stock information 212 as the stock information 413 in the memory 41.

In the case where the stock information 212 has been assigned (YES in S6), it is determined whether the pieces of paper attribute information 212b and 4121b with the identical stock names 212a and 4121a are consistent with each other (S8). In the case where the pieces of paper attribute information 212b and 4121b are consistent with each other (YES in S8), and in the case where updating to all the pieces of stock information 212 is completed (YES in S4), the process ends. That is, updating to the stock information 212 is not performed.

In the case where the pieces of paper attribute information 212b and 4121b are not consistent with each other in step S8 described above (NO in S8), the fact that the pieces of paper attribute information are not consistent with each other, and a confirmation screen for asking the second administrator about whether it is permitted to rewrite the stock information 4121 held by the printer 4 with the stock information 212 held by the controller 2 are displayed on the display 42 of the printer 4121 (S9).

In the case where rewriting is permitted (YES in S9), the printer 4 is instructed to delete and add stock information (S10). The control unit 40 of the printer 4 deletes and adds stock information in the memory 41. Alternatively, after rewriting is performed without displaying a confirmation screen for the second administrator, the fact that the rewriting has been performed may be reported to the second administrator.

Specific Examples

Next, specific examples will be described with reference to FIGS. 5A to 8C.

Figure 5A:
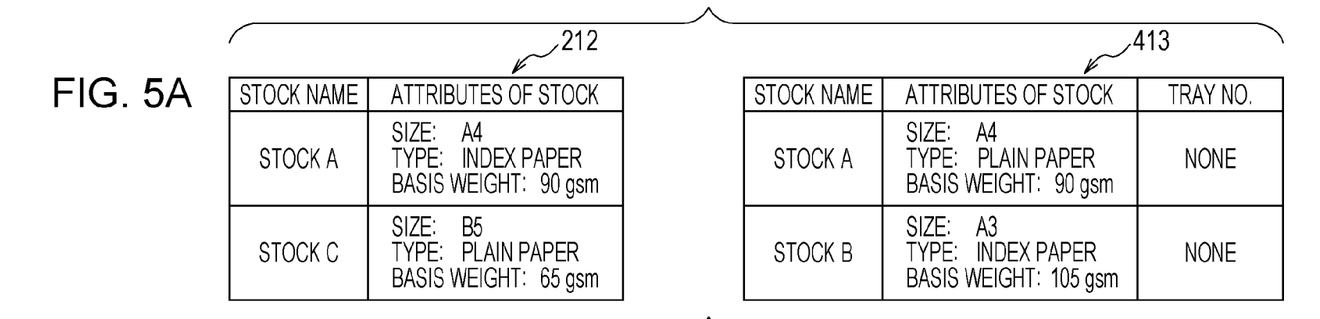
FIGS. 5A to 5C are diagrams for describing changes in stock information held by a controller and tray information held by a printer.

FIG. 5A illustrates the case in which inconsistency occurs between the stock information 413 held by the printer 4 and the stock information 212 held by the controller 2.

Figure 5B:
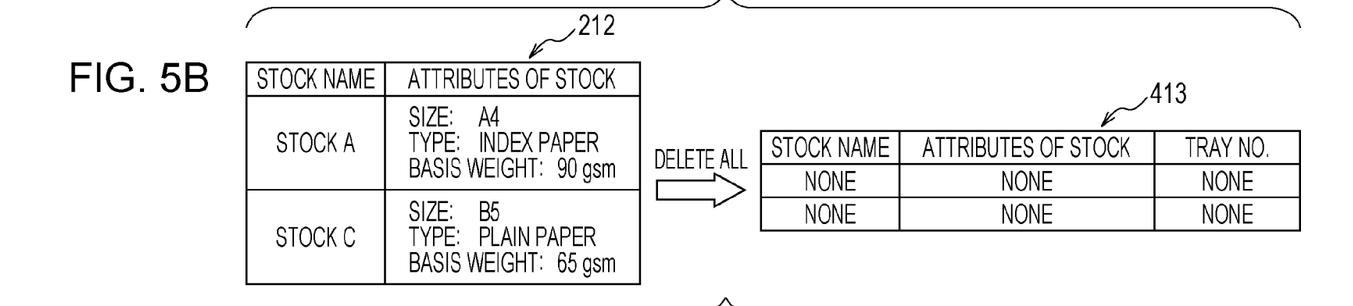

In this case, as illustrated in FIG. 5B, in response to a deletion instruction from the controller 2, all the pieces of stock information 413 not assigned to a paper feed tray 46 are deleted by the control unit 40 of the printer 4. In FIG. 5B, pieces of stock information 413 of "stock A" and "stock B" are deleted. If "stock C" is additionally held in the printer 4, the stock information 413 of "stock C" will also be deleted.

Figure 5C:
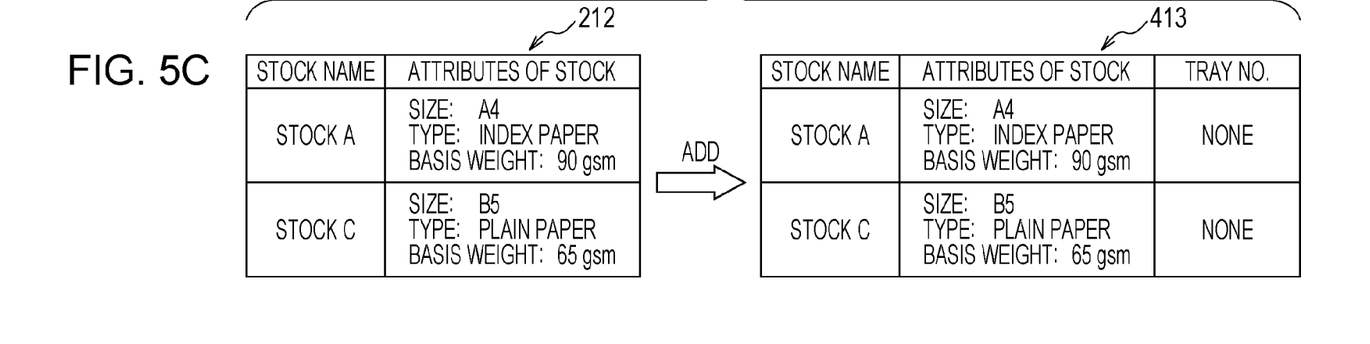

Next, as illustrated in FIG. 5C, in response to an addition instruction from the controller 2, all pieces of stock information 212 held by the controller 2 are written as the stock information 413 in the memory 41 of the printer 4. Accordingly, inconsistency between the controller 2 and the printer 4 is removed.

Figure 6A:
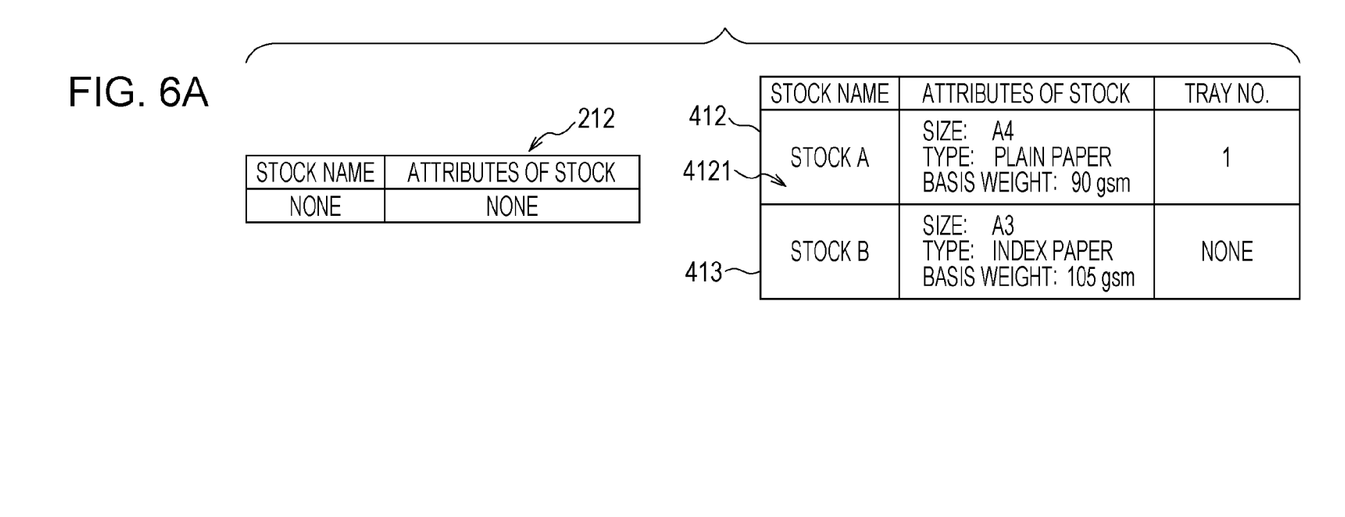
FIGS. 6A and 6B are diagrams for describing changes in stock information held by the controller and tray information held by the printer.

FIG. 6A illustrates the case in which, because the printer 4 holds the stock information 4121 and 413 but the controller 2 does not hold the stock information 212, inconsistency occurs between the two.

Figure 6B:
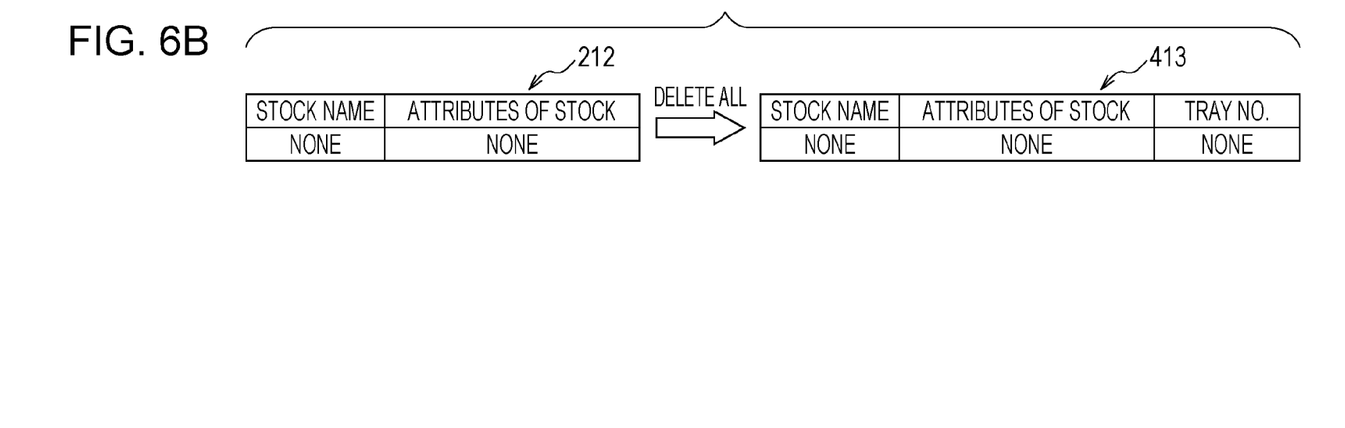

In this case, as illustrated in FIG. 6B, in response to a deletion instruction from the controller 2, the stock information 413 not assigned to a paper feed tray 46 is deleted by the control unit 40 of the printer 4. The stock information 4121 assigned to a paper feed tray 46 is deleted by the control unit 40 of the printer 4 in the case where deletion is permitted by the second administrator. At this time, assignment is also removed. Accordingly, inconsistency between the controller 2 and the printer 4 is removed.

Figure 7A:
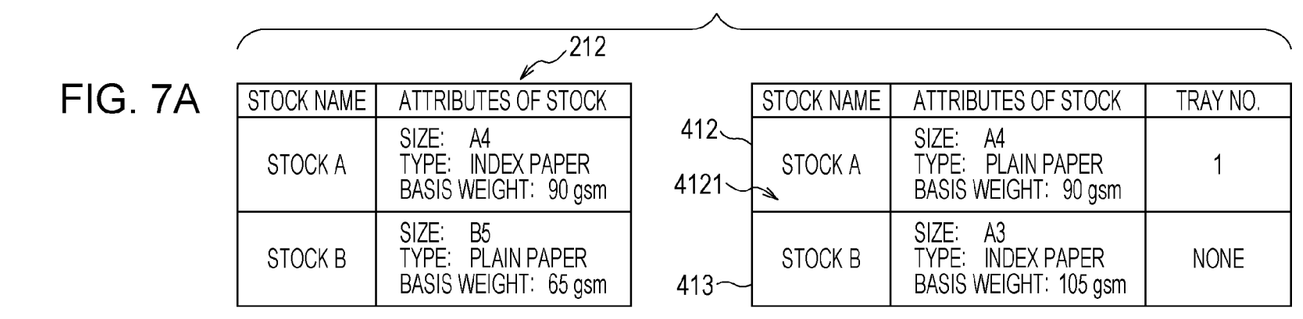
FIGS. 7A to 7C are diagrams for describing changes in stock information held by the controller and tray information held by the printer.

FIG. 7A illustrates the case in which inconsistency occurs between the stock information 4121 and 413 held by the printer 4 and the stock information 212 held by the controller 2.

Figure 7B:
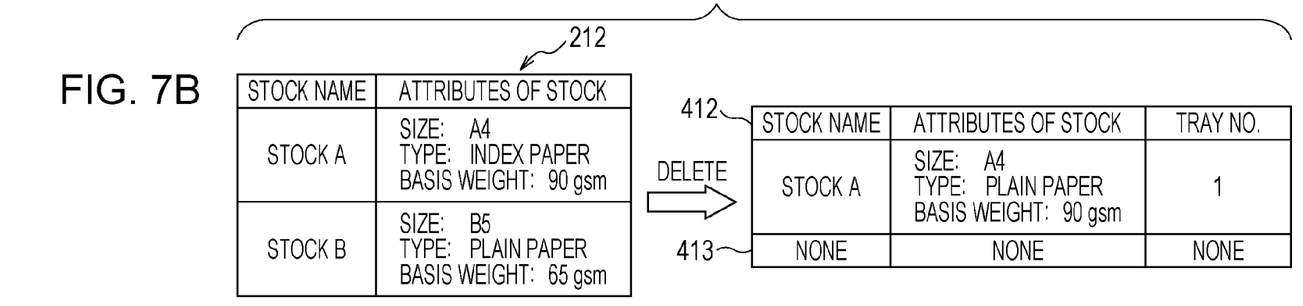
Figure 7C:
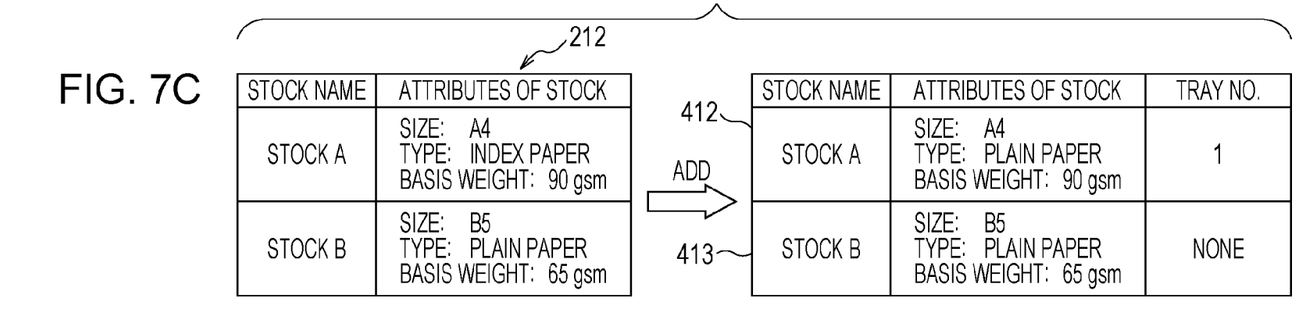

The stock information 4121 of the printer 4 is assigned to tray number "1". In this case, as illustrated in FIG. 7B, after the stock information 413 not assigned to tray number "2" is deleted by the control unit 40, as illustrated in FIG. 7C, the stock information 212 in the controller 2 is written. Accordingly, although inconsistency occurs between the controller 2 and the printer 4 for "stock A" assigned to a paper feed tray 46, inconsistency between the controller 2 and the printer 4 is removed for "stock B" that is not assigned to a paper feed tray 46.

Figure 8A:
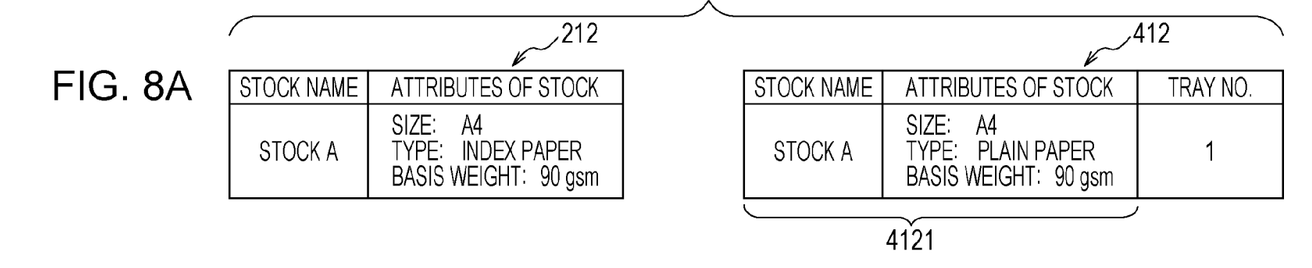
FIGS. 8A to 8C are diagrams for describing changes in stock information held by the controller and tray information held by the printer.

FIG. 8A illustrates the case in which inconsistency occurs between the stock information 4121 held by the printer 4 and the stock information 212 held by the controller 2. The stock information 4121 of the printer 4 is assigned to tray number "1". In the case illustrated in FIG. 8A, although the stock names are identical, pieces of paper attribute information are different.

Figure 8B:
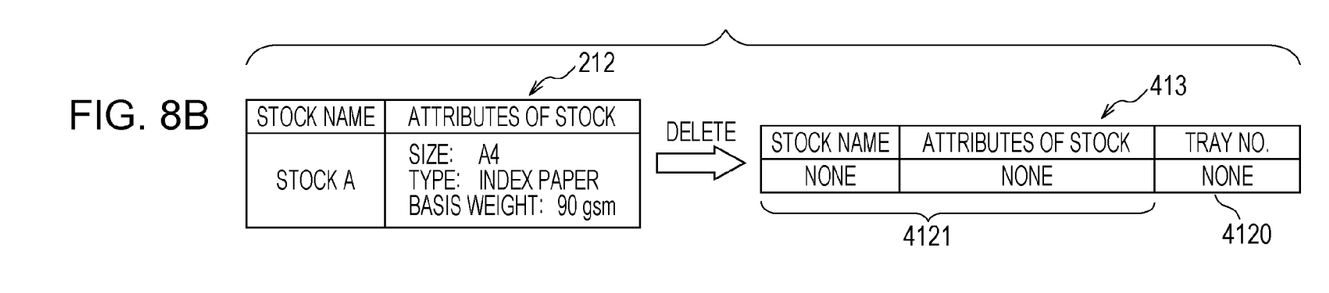
Figure 8C:
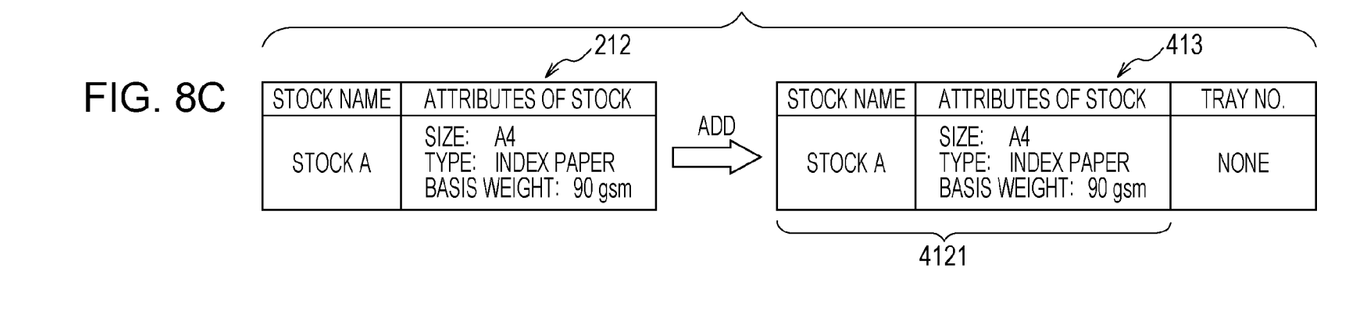

In this case, as illustrated in FIG. 8B, after the stock information 4121 and tray number 4120 assigned to tray number "1" are deleted by the control unit 40 when updating is permitted by the second administrator, as illustrated in FIG. 8C, the stock information 212 held by the controller 2 is written by the control unit 40 as the stock information 4121. Accordingly, inconsistency between the stock information 212 held by the controller 2 and the stock information 413 held by the printer 4 is removed. Although assignment is also removed when the stock information 4121 is deleted in the above-described example, assignment may remain unremoved.

Although the exemplary embodiment of the present disclosure has been described above, the exemplary embodiment of the present disclosure is not limited to the above-described exemplary embodiment, and various modifications may be implemented within a scope not changing the gist of the present disclosure.

Some (one or more) or all of the units of the control unit 20 may be set up by a hardware circuit such as a field-programmable gate array (FPGA) or an application-specific integrated circuit (ASIC).

In addition, some (one or more) of the elements of the above-described exemplary embodiment may be omitted or changed within a scope not changing the gist of the present disclosure. In addition, one or more steps may be added, deleted, changed, or replaced in the flow of the exemplary embodiment within a scope not changing the gist of the present disclosure. A program used in the above-described exemplary embodiment may be provided by being recorded in a computer-readable recording medium such as compact-disc read-only memory (CD-ROM). In addition, a program used in the above-described exemplary embodiment may be stored in an external server such as a cloud server, and used via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print instruction apparatus comprising:
    memory that stores attribute information of paper;
    a processor configured to function as:
        an obtaining unit that obtains paper feed information in which attribute information of paper is set to a paper feed unit provided in a printing apparatus; and
        a controller that applies control to, in accordance with whether or not the attribute information of paper is set to the paper feed unit on the basis of the obtained paper feed information, perform rewriting of the attribute information of paper with the attribute information of paper stored in the memory;
    wherein, in a case where the attribute information of paper is set to the paper feed unit, the controller performs the rewriting in accordance with consistency between the attribute information of paper included in the obtained paper feed information and the attribute information of paper stored in the memory, and wherein the controller performs the rewriting in a case where identification information of the attribute information of paper included in the obtained paper feed information and identification information of the attribute information of paper stored in the memory are identical, and pieces of attribute information of paper in the obtained paper feed information and pieces of attribute information of paper stored in the memory are different.

2. The print instruction apparatus according to claim 1, wherein the controller does not perform the rewriting in a case where identification information of the attribute information of paper included in the obtained paper feed information, and identification information of the attribute information of paper stored in the memory are identical, and the pieces of attribute information of paper in the obtained paper feed information and the pieces of attribute information of paper stored in the memory are identical.

3. The print instruction apparatus according to claim 1, wherein, when performing the rewriting, the controller displays that the attribute information of paper has been rewritten.

4. The print instruction apparatus according to claim 2, wherein, in a case where the attribute information of paper is not set to the paper feed unit, the controller applies control to perform the rewriting regardless of consistency between the attribute information of paper included in the obtained paper feed information and the attribute information of paper stored in the memory.

5. The print instruction apparatus according to claim 1, wherein, in a case where the attribute information of paper is not set to the paper feed unit, the controller applies control to perform the rewriting regardless of consistency between the attribute information of paper included in the obtained paper feed information and the attribute information of paper stored in the memory.

6. The print instruction apparatus according to claim 3, wherein, in a case where the attribute information of paper is not set to the paper feed unit, the controller applies control to perform the rewriting regardless of consistency between the attribute information of paper included in the obtained paper feed information and the attribute information of paper stored in the memory.

7. The print instruction apparatus according to claim 5, wherein the controller applies control to perform the rewriting in a case where the obtaining unit is unable to obtain the paper feed information.

8. The print instruction apparatus according to claim 1, wherein the controller applies control to delete the attribute information of paper set to the printing apparatus in a case where no attribute information of paper is stored in the memory.

9. The print instruction apparatus according to claim 1, wherein the controller performs the rewriting at a predetermined time point.

10. The print instruction apparatus according to claim 2, wherein the controller performs the rewriting at a predetermined time point.

11. The print instruction apparatus according to claim 3, wherein the controller performs the rewriting at a predetermined time point.

12. A print instruction apparatus comprising:
memory that stores attribute information of paper;
a processor configured to function as:
an obtaining unit that obtains paper feed information in which attribute information of paper is set to a paper feed unit provided in a printing apparatus; and
a controller that applies control to, in accordance with whether or not the attribute information of paper is set to the paper feed unit on the basis of the obtained paper feed information, perform rewriting of the attribute information of paper with the attribute information of paper stored in the memory,
wherein the controller performs the rewriting at a predetermined time point,
wherein the predetermined time point is when the printing apparatus is restored from a power-off state or a power-saving state to a normal state.

13. A print system comprising:
a printing apparatus, comprising a printer, in which attribute information of paper is set to a paper feed unit as paper feed information; and
a print instruction apparatus including: memory that stores attribute information of paper; a processor configured to function as: an obtaining unit that obtains the paper feed information; and a controller that applies control to, in accordance with whether or not the attribute information of paper is set to the paper feed unit on the basis of the obtained paper feed information, perform rewriting of the attribute information of paper with the attribute information of paper stored in the memory,
wherein, in a case where the attribute information of paper is set to the paper feed unit, the controller performs the rewriting in accordance with consistency between the attribute information of paper included in the obtained paper feed information and the attribute information of paper stored in the memory, and
wherein the controller performs the rewriting in a case where identification information of the attribute information of paper included in the obtained paper feed information and identification information of the attribute information of paper stored in the memory are identical, and pieces of attribute information of paper in the obtained paper feed information and pieces of attribute information of paper stored in the memory are different.

14. A non-transitory computer readable medium storing a program causing a computer including memory that stores attribute information of paper to execute a process, the process comprising:
obtaining paper feed information in which attribute information of paper is set to a paper feed unit provided in a printing apparatus;
applying control to, in accordance with whether or not the attribute information of paper is set to the paper feed unit on the basis of the obtained paper feed information, perform rewriting of the attribute information of paper with the attribute information of paper stored in the memory;
in a case where the attribute information of paper is set to the paper feed unit, rewriting in accordance with consistency between the attribute information of paper included in the obtained paper feed information and the attribute information of paper stored in the memory; and
rewriting in a case where identification information of the attribute information of paper included in the obtained paper feed information and identification information of the attribute information of paper stored in the memory are identical, and pieces of attribute information of paper in the obtained paper feed information and pieces of attribute information of paper stored in the memory are different.

\* \* \* \* \*